Oct. 3, 1961
J. S. LANHAM ET AL
3,002,377
CYLINDER BALANCE TESTER
Filed Oct. 30, 1958
3 Sheets-Sheet 1
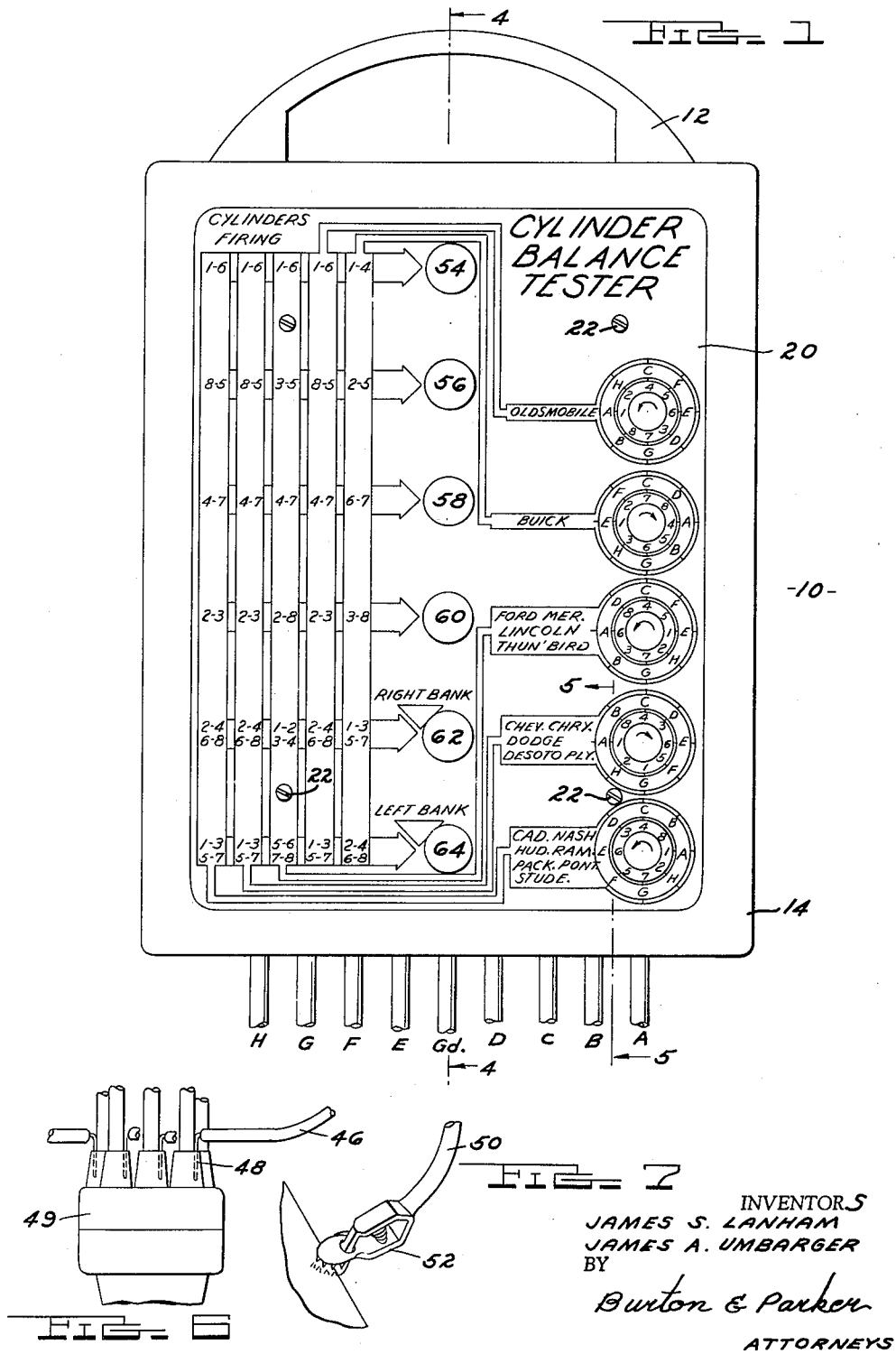
INVENTORS
JAMES S. LANHAM
JAMES A. UMBARGER
BY
Burton & Parker
ATTORNEYS

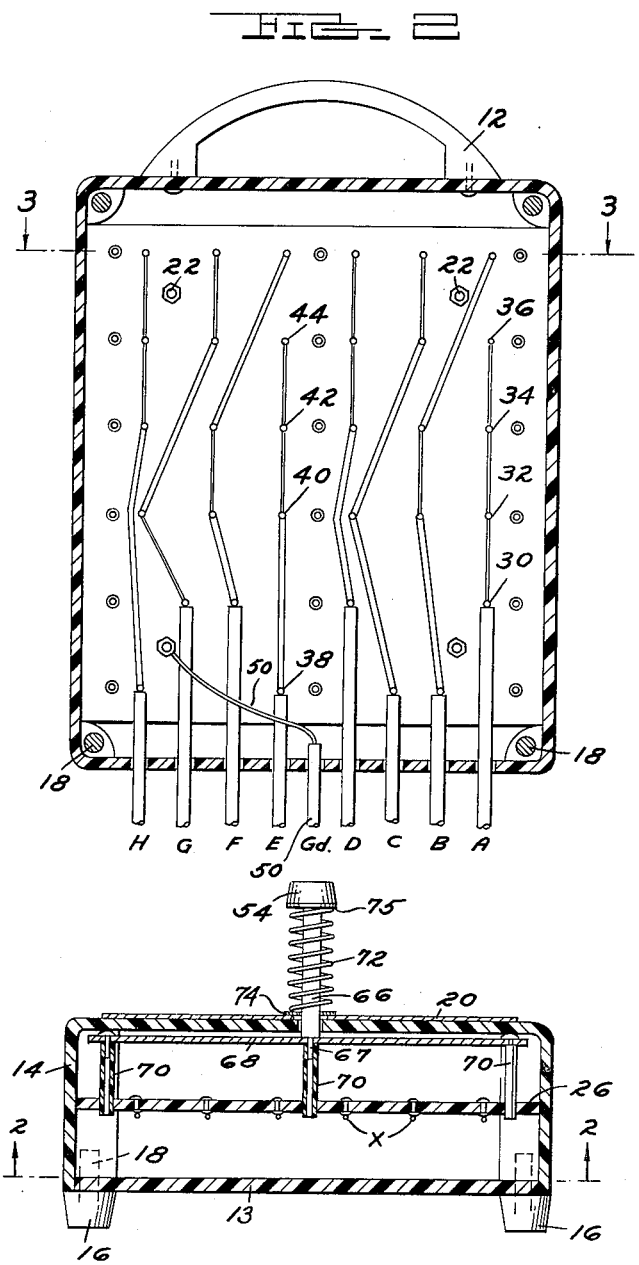

Oct. 3, 1961  J. S. LANHAM ET AL  3,002,377
CYLINDER BALANCE TESTER
Filed Oct. 30, 1958  3 Sheets-Sheet 3

INVENTORS
JAMES S. LANHAM
JAMES A. UMBARGER
BY
Burton & Parker
ATTORNEYS

United States Patent Office 3,002,377
Patented Oct. 3, 1961

3,002,377
CYLINDER BALANCE TESTER
James S. Lanham, Lathrup Village, and James A. Umbarger, Cheboygan, Mich., assignors to Kent-Moore Organization, Inc., Warren, Mich., a corporation of Michigan
Filed Oct. 30, 1958, Ser. No. 770,694
2 Claims. (Cl. 73—116)

This invention relates to a cylinder balance tester for a multi-cylinder internal combustion engine such as is used in automobiles and particularly to such an engine wherein the cylinders are arranged in companion pairs in two banks, viz: a right bank and a left bank of cylinders.

In servicing automobile engines, it may develop that certain cylinders are not functioning efficiently. The engine lacks power or functions irregularly and if such is due to one or more of the cylinders not producing its intended power output, the problem is to locate the particular cylinder that is not functioning properly.

This cylinder balance tester mechanism is designed to assist the mechanic in determining which cylinder or cylinders are failing to contribute its intended power output.

In the conventional V-8 internal combustion engine, the cylinders are mounted in two banks, a right bank and a left bank of four cylinders each. They are also arranged in four companion pairs of cylinders, one cylinder of each pair being located in each bank. The two cylinders in the pair fire substantially simltaneously or successively close together.

Several diffferent firing orders are used in different automobiles. One conventional firing order is for the cylinders to be arranged in companion pairs as follows: 1 and 6, 8 and 5, 4 and 7, and 3 and 2.

This particular cylinder balance tester is designed to be universal in its use in that it is adapted for use with any of the well known automobile engines and can be fitted to the conventional firing orders which are used thereon.

An object is the provision of a device of the character described which can be readily connected with the electric leads into the cylinders of an engine being tested and the mechanism may then be operated so as to locate the particular cylinder or cylinders which are not functioning in the proper manner. Once the mechanism is properly connected with the engine cylinders through the electric leads thereto, it is a relatively simple matter to locate the offending cylinders and this can be done in such a manner that it is not dependent upon unusual skill or precision on the part of a mechanic.

The mechanism is shown as adapted for connection with an 8-cylinder internal combustion engine having its cylinders arranged in two banks of four each because such engine is the one that the mechanism would ordinarily be employed with. My improved cylinder balance tester is designed to be used with other devices which are conventional and available in service stations adapted to take care of automobile engines, such as a tachometer and vacuum gauge.

The cylinder balance tester of this application is adapted when properly coupled with the engine to short out three of the companion pairs of cylinders in an 8-cylinder engine thereby permitting the engine to function on only one companion pair of cylinders. The mechanism is capable of being operated so as to short out any three companion pairs so that an engine may be caused to function at different times on each of its four companion pairs of cylinders. The mechanism is then further operable to short out either the right bank or the left bank of cylinders to permit the engine to function on either bank alone. Continuing this operation, it is possible to pinpoint the particular offending cylinder or cylinders and to quickly locate the same so that proper attention may be given to remedy the difficulty.

The specific embodiment of the invention herein disclosed is one that responds to push button operation and it is capable of being quickly connected with the distributor of an automobile internal combustion engine and once connected properly with the engine distributor and with connection made by a tachometer and vacuum gauge with the engine, it is possible to quickly and accurately locate the engine cylinders which are not functioning properly.

Another object is that when the cylinder balance tester is once hooked up with the electric leads to an engine all readings may be taken and even rechecked without additional hookups.

Another meritorious feature is that companion pairs of cylinders may be readily checked against each other, and one bank of cylinders may be checked against a companion bank, all from a single hookup with the engine.

More specifically this device provides simple mechanism for readily "shorting out" all of the cylinders except one companion pair, and this may be pursued in sequence until each companion pair has been tested. Then the mechanism may be operated to short out first one bank and then the other bank of cylinders testing such banks against each other.

Various other objects, advantages, and meritorious features of the mechanism will appear from the following description, claims, and accompanying drawings, wherein:

FIG. 1 is an elevation of the cylinder balance tester showing a diagrammatic view of the face thereof which carries the operating devices and information data and showing schematic connection thereof with an engine.

FIG. 2 is a sectional view through the device shown in FIG. 1 but taken on the line 2—2 of FIG. 3;

FIG. 3 is a cross sectional view taken on the line 3—3 of FIG. 2;

FIG. 6 is a fragmentary elevation of a portion of the distributor head of an engine;

FIG. 7 is a fragmentary perspective of the ground connection of the device shown.

Figure 4:
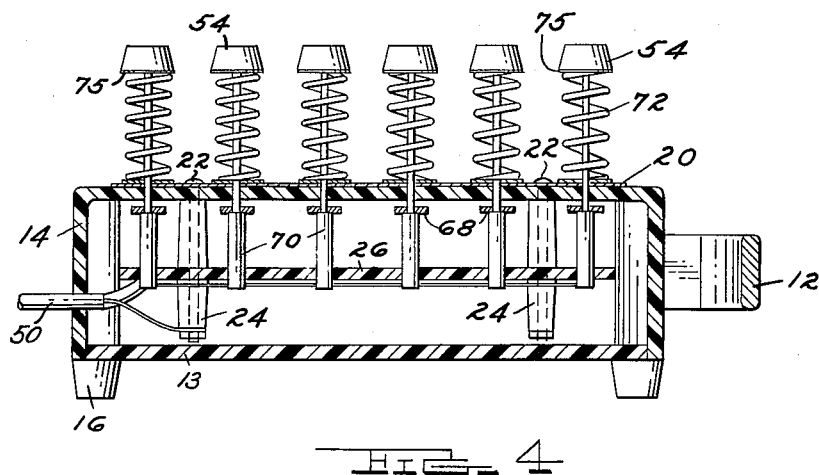
FIG. 4 is a cross sectional view taken on the line 4—4 of FIG. 1.

This cylinder balance mechanism comprises a switch box which, in FIG. 1, is indicated by the numeral 10 and is provided with a handle 12. The face plate shown in FIG. 1 indicates the firing order of the cylinders in certain groups of automobiles and shows diagrammatically the push buttons which are provided to make connection with certain groups of leads extending from the switch box and schematically illustrates in columns the firing order of certain cars.

The switch box or terminal block itself is shown best in FIGS. 2 and 3 and comprises a bottom 13, which is in the form of a plate of insulating material such as Bakelite or the like, and a box-like cover plate 14 which has sides formed integrally therewith. The cover may be formed of the same material as the bottom. The bottom may be provided with legs 16. Pins 18 may be used to secure the top and bottom together. There is a metal face plate 20 shown in FIGS. 1, 3, 4, and 5. This face plate is secured to the cover by pins 22 which extend through spacers 24 as shown in FIGS. 4 and 5 and which spacers support a partition element 26 within the interior of the box.

Figure 5:
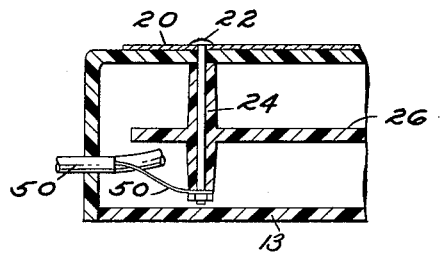
FIG. 5 is a cross sectional fragmentary view taken on the line 5—5 of FIG. 1.

This partition element would be formed of suitable insulating material and spaced between the top and bottom of the box as shown particularly in FIGS. 3, 4, and 5. This particular switch box is shown as provided with 8 electric leads numbered A, B, C, D, E, F, G, and H in FIG. 2. These leads are arranged in two sets of four each as shown in FIG. 2. These two sets of four leads each are disposed, as shown in such FIG. 2, on opposite sides of a ground lead 50. These electric leads extend into the box and it will be noted that each lead is provided with four contact points supported upon the partition.

For example, lead A is shown in FIG. 2 as provided with contact points 30, 32, 34, and 36, and lead E is shown as provided with contact points 38, 40, 42, and 44. The other leads are similarly each provided with four contact points each mounted upon the partition. Such contact points are indicated generally in FIG. 3 by the letter X.

These contact points are so relatively arranged upon the partition 26 in such a geometric pattern that a plurality of switch bars, each responsive to a separate push button, may be employed to bridge the contacts in a manner to short out three pairs of companion cylinders of any conventional firing order 8-cylinder internal combustion engine, leaving one pair to function or for the engine to run on.

Each of the electric leads, as, for example, lead H, is provided with a flexible extension 46 which terminates at its outer end in a pin or contact element 48. The contact element is in any shape desired to make contact with an electric lead to a spark plug, as with the contact in the output side of the engine distributor. This is shown in FIG. 1, where the distributor is indicated as 49 and the flexible portion of lead H is indicated as provided by pin contact 48.

The pin 48 shown in FIG. 6 is adapted to be received as shown in such figure within the head of a distributor cap 49 to make contact with a lead to a spark plug of a cylinder of the engine with which the device is being used. The ground lead, which is indicated as 50, has a flexible extension that terminates in a clamping device or the like indicated as 52 which is adapted to be grounded upon the automobile provided with the engine that is being tested.

The switch mechanism includes six push buttons indicated as 54, 56, 58, 60, 62, and 64 in the schematic illustration in FIG. 1. FIG. 3 shows the push button 54 as having a shank 66 extending through the metal plate 20 and the cover 14 and connected within the box by its axial pin 67 with a conductive metal bridge bar 68. This bridge bar is provided with a plurality of guide pins 70, three being here shown in FIG. 3. These guide pins extend through apertures in the partition 26 and guide the movement of the bridge bar 68. Push button 54 is held in the elevated position by a spring 72 as are all the other push buttons. A metal washer or the like 74 surrounds the pin and seats on top of the plate 20 and a metal washer 75 surrounds the pin above the spring 7 and such may be brazed to the pin.

The ground lead 50 is shown as connected in FIG. 4 with the metal pin 22 which extends through the partition and spacers 24 and the head of which rests upon the metal plate 20 as shown in FIG. 5.

The circuit to the ground may be through the contacts bridged by a bridge bar 68 to the pin extension 67 and pin 66 and washer 75 and spring 72 to the metal plate 20. This face plate 20 is common to all of the push button devices and is connected by pin 22 with the ground lead 50.

In the testing of an automobile internal combustion engine, a test is conducted by running the engine in turn on successive companion pairs of cylinders while grounding all the other cylinders. The comparison of one set of companion cylinders against another set indicates whether or not the power output of the several pairs is approximately equal. To perform the test the ground lead 50 with the clip 52 is connected to a good ground on the engine. The ignition leads, which are the terminal pins of the electric leads A, B, C, D, E, F, G, and H in FIG. 2, are inserted in the cap of the distributor to make contact with the proper leads from the distributor to the cylinders for the particular engine being tested.

Consider that a Cadillac is being tested. The diagram at the right of the face plate indicates that the A lead would be connected with the No. 1 cylinder and E lead with the No. 6 cylinder, etc., as shown in the diagram. The electric leads will be connected with the cylinders depending upon the firing order of the engine of the car being tested. Thus in the group of cylinders to which reference was just made, the order of firing of companion cylinders would be pair 1—6, pair 8—5, pair 4—7, and pair 3—2, as shown in the first vertical column at the left of FIG. 1. It is understood that the vertical columns at the left of the face plate indicate the order of firing for the groups of cylinders connected therewith as indicated by the diagrams at the right of the face plate. With the engine running on all cylinders it would be set to a speed of, say, 1500 r.p.m. A tachometer and a vacuum gauge would be connected to the engine.

The test would be started by pressing on the topmost button 54, which would depress the bridge element 68 to bridge the contacts in leads B, C, D, F, G, and H. This would short out all these leads and leave only the leads A and E to cylinders 1 and 6 upon which the engine would run. Obviously the r.p.m. of the engine would fall off and the vacuum would be affected. The r.p.m. reading would be noted with the engine operating on only cylinders 1 and 6 and the vacuum would be noted.

After the engine had run on these two cylinders for half a minute or so and the readings had been taken, the button 54 would be released and the engine would be allowed to run for a few seconds normally. The next button 56 would then be depressed and another set of readings taken. This time the engine would be running on cylinders 5 and 8. Such testing would be continued until a reading had been taken for each of the companion pairs of cylinders.

Should the operator find, for example, that the engine ran less efficiently on cylinders 1 and 6, he might assume that either one or both of these cylinders was not functioning properly. To isolate the offending cylinder he would then test each of the two banks of cylinders, one against the other. He might press button 62, which would short out the left bank of cylinders allowing the engine to run on the right bank. Readings would be taken for this operation. This button would then be released and the engine would be run on the left bank of cylinders with the right bank shorted out. In this manner he could compare the two banks with each other. In this manner the left bank and the right bank of cylinders can each be separately shorted out and the mechanic can determine which bank functions more effectively and thereby can, through pursuing the method herein set forth, eventually determine which cylinder is failing to perform its intended function.

What we claim is:
1. A cylinder balance tester for an automobile multicylinder internal combustion engine whereby the engine performance can be evaluated by an appropriate indicator responsive to operation of selected cylinder groups, provided with a distributor having a plurality of electric leads extending to a spark plug in each of the cylinders in the engine comprising, in combination, switch mechanism having a switch box provided with eight electric leads, each lead having four contact points disposed within the box and a contact pin outside of the box, said contact pin receivable within the distributor of the engine to make contact with a spark plug lead therein, said eight electric leads constituting four companion pairs of leads, said four companion pairs of leads divided into two separate sets of four leads each, one set consisting of one lead from each of said four companion pairs of leads and the other set consisting of the other lead from each of said four companion pairs of leads, said switch mechanism provided with a ground lead having a part outside of the box adapted to be grounded upon the automobile, said switch mechanism having four independently manually manipulable switch members one for each of three predetermined companion pairs of leads, and four lead contact bridging means one for each switch member and responsive thereto, each contact bridging means responsive to manipulation of its switch member to simultaneously connect the three companion pairs of leads controlled by such switch member with the ground, such switch mechanism also having two additional switch members one for each of said two sets of four leads and having two lead contact bridging means one for each of said additional switch members and responsive to manipulation of its switch member to simultaneously connect the set of four leads controlled by such switch member with the ground.

2. A cylinder balance tester for an automobile multi-cylinder internal combustion engine, whereby the engine performance can be evaluated by an appropriate indicator responsive to selected cylinder groups, provided with a distributor having a plurality of electric leads extending to a spark plug in each of the cylinders of the engine comprising, in a combination: switch mechanism comprising a switch box having a plurality of electric leads equal in number to the number of cylinders of the engine, said plurality of electric leads consisting of a plurality of companion pairs of leads equal to the number of companion pairs of cylinders in the engine, each lead having that number of contact points within the box which equals the number of companion pairs of leads, each lead extending from its contact points within the box to a contact pin outside of the box, said contact pin receivable within the distributor to form contact with an electric spark plug lead contact therein, a ground lead extending from within the box to a part outside of the box adapted to be grounded upon the automobile, said companion pairs of leads divided into two separate sets of an equal number of leads, one set consisting of one lead from each of the companion pairs of leads and the other set consisting of the other lead from each of the companion pairs of leads, manually manipulable switch means including contact bridging means responsive to a determined manipulation of the manually manipulable switch means to connect that plurality of companion pairs of electric leads within the switch box less by one than the total number of companion pairs therein simultaneously as a group with the ground lead leaving one companion pair of leads disconnected from the ground, additional manually manipulable switch means including contact bridging means responsive to a determined manipulation of the manually manipulable switch means to connect either of said two sets of leads with the ground leaving the other set disconnected therefrom.

References Cited in the file of this patent
UNITED STATES PATENTS

| | | |
|---|---|---|
| 1,496,383 | Seppmann | June 3, 1924 |
| 2,125,277 | Haupt | Aug. 2, 1938 |
| 2,445,245 | Sexton | July 13, 1948 |